United States Patent
Nelson et al.

(10) Patent No.: US 10,901,732 B1
(45) Date of Patent: Jan. 26, 2021

(54) SYSTEM AND METHOD USING A BLOCKCHAIN MATRIX

(71) Applicant: Sprint Communications Company L.P., Overland Park, KS (US)

(72) Inventors: Tracy L. Nelson, Overland Park, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 21 days.

(21) Appl. No.: 16/508,230

(22) Filed: Jul. 10, 2019

(51) Int. Cl.
  *G06F 9/22* (2006.01)
  *G06Q 30/04* (2012.01)
  *H04L 9/06* (2006.01)

(52) U.S. Cl.
  CPC ............ *G06F 9/223* (2013.01); *G06Q 30/04* (2013.01); *H04L 9/0643* (2013.01); *H04L 2209/38* (2013.01)

(58) Field of Classification Search
  CPC ...... H04L 2209/38; G06F 9/223; G06Q 30/04
  See application file for complete search history.

(56) References Cited

U.S. PATENT DOCUMENTS

| | | | |
|---|---|---|---|
| 2016/0128016 A1* | 5/2016 | Avary | H04W 12/02 455/517 |
| 2018/0108194 A1* | 4/2018 | Link, II | H04W 12/06 |
| 2018/0174376 A1* | 6/2018 | Avary | G07C 5/008 |
| 2019/0332107 A1* | 10/2019 | Shimizu | B60L 58/14 |
| 2020/0081699 A1* | 3/2020 | Majed | G06F 8/65 |
| 2020/0265442 A1* | 8/2020 | Parker | G06Q 20/389 |

* cited by examiner

*Primary Examiner* — Brian W Wathen (57) ABSTRACT

A method of initializing a subsystem by reading microcode from a block of a static blockchain associated to the subsystem, executing the microcode to configure the subsystem, and building event blocks associated with the subsystem using the block of the static blockchain as a genesis block of a live subsystem blockchain. The method comprises reading a block associated to a subsystem by an application executing on a processor of the subsystem, where the block associated to the subsystem is one of a plurality of blocks in a static blockchain, executing microcode of the block read by the application, based on executing the microcode, configuring the subsystem for operation, creating an event block by the application, where the event block stores information about an event generated by the subsystem operating based on the configuration, and attaching the event block to a live subsystem blockchain associated with the subsystem.

20 Claims, 4 Drawing Sheets

SYSTEM AND METHOD USING A BLOCKCHAIN MATRIX

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Systems may be configured with two or more subsystems. The system may monitor and control the subsystems embedded within it. For example, a central computer system referred to as a telematics unit or a head unit in an automobile may monitor and control subsystems such as an engine control subsystem, an entertainment subsystem, a backup camera subsystem, an environmental control subsystem, a navigation assistance subsystem, and other subsystems.

SUMMARY

In an embodiment, a method of initializing a subsystem by reading microcode from a block of a static blockchain associated to the subsystem, executing the microcode to configure the subsystem, and building event blocks associated with the subsystem using the block of the static blockchain as a genesis block of a live subsystem blockchain is disclosed. The method comprises reading a block associated to a subsystem by an application executing on a processor of the subsystem, where the block associated to the subsystem is one of a plurality of blocks in a static blockchain and executing microcode of the block read by the application. The method further comprises, based on executing the microcode, configuring by the application the subsystem for operation within a system in which the subsystem is embedded, creating an event block by the application, where the event block stores information about an event generated by the subsystem operating based on the configuration, and attaching the event block to a live subsystem blockchain associated with the subsystem.

In another embodiment, a subsystem is disclosed. The subsystem comprises a processor, a non-transitory memory, and an application stored in the non-transitory memory. When executed by the processor, the application reads a block associated to the subsystem, wherein the block is one of a plurality of blocks in a static blockchain and executes microcode read from the block. The application further, based on executing the microcode, configures the subsystem for operation within a system in which the subsystem is embedded, creates an event block that stores information about an event generated by the subsystem operating based on the configuration, and attaches the event block to a live subsystem blockchain associated with the subsystem.

In yet another embodiment, a system controller is disclosed. The system controller comprises a processor, a non-transitory memory, and a subsystem management application stored in the non-transitory memory. The non-transitory memory comprises a blockchain matrix that comprises a static blockchain, where the static blockchain comprises a matrix genesis block and a plurality of subsystem genesis blocks, where the matrix genesis block comprises a first package of microcode that, when executed by the processor, configures the system controller for building live subsystem blockchains that are founded using the subsystem genesis blocks, where each subsystem genesis block serves as a genesis block of a different live subsystem blockchain and comprises a package of microcode that, when executed by a subsystem, configures the subsystem for operation within a system controlled by the system controller. When executed by the processor, the subsystem management application receives event blocks from the subsystems, stores the event blocks to a live subsystem blockchain associated with the subsystem that generated the event blocks in the non-transitory memory, and processes each of the event blocks of the live subsystem blockchain associated with a subsystem to generate a report on the operations of the subsystem.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a new form of blockchain that may be referred to as a blockchain matrix. The blockchain matrix comprises a plurality of interlocked or intermeshed blockchains. Initially the blockchain matrix comprises a static blockchain that comprises a matrix genesis block, a predefined number of subsystem genesis blocks, and a terminal block. The static blockchain is referred to as static because once built, for example built by an original equipment manufacturer (OEM) of a system controller, the static blockchain does not grow—no new blocks may be founded and attached to the static blockchain. Each of the subsystem genesis blocks fill the role of genesis blocks of subsystem blockchains which are initially dormant. The dormant subsystem blockchains comprise only the subsystem genesis block.

When a subsystem is first activated it reads its associated subsystem genesis block in the static blockchain and executes microcode stored in that subsystem genesis block. The microcode in the subsystem genesis block may provide instructions on how the subsystem is to perform a subsystem function in a first system context. The microcode in the subsystem genesis block may provide data to configure the subsystem to perform its function in the first system context. The microcode may configure the subsystem to found and/or build event blocks that are added to the previously dormant subsystem blockchain associated with the subsystem in the first system context. The first event block may be built when the subsystem is first activated and may record a time and result of the configuration and activation of the subsystem. It is noted that the same subsystem hardware installed in a second system having a different static blockchain with different microcode stored in the subsystem genesis block can be initialized differently and behave differently in the second system, based on the different microcode in the different static blockchains of the two different systems.

In an embodiment, the event blocks generated by subsystems are stored with the static blockchain in a central storage location, for example in a storage coupled to or within a system controller. Alternatively, the event blocks of a first subsystem may be stored in storage coupled to that first subsystem and event blocks of a second subsystem may be stored in storage coupled to that second subsystem. In an embodiment, metadata may be associated to the blockchain matrix that promote navigating through the blockchain matrix. For example, each subsystem genesis block may comprise a static blockchain link or reference to the next subsequent block in the static blockchain (which is either another subsystem genesis block or the terminal block of the static blockchain) and a subsystem blockchain link. By following the static blockchain link, a traverser application or subroutine may pass from a first block in the static blockchain to a subsequent block in the static blockchain. By following the subsystem blockchain link, by contrast, the traverser application or subroutine may pass from a subsystem genesis block to a first event block of the subject subsystem blockchain. Metadata may be associated to the event blocks to promote navigation from a first event block of a subsystem blockchain to a subsequent event block of the same subsystem blockchain. In some sense these metadata links may be abstracted out of the basic concept of the blockchain matrix, as it may generally be assumed there is an information technology (IT) infrastructure that supports navigating forwards and backwards along the static blockchain and the subsystem blockchains. Still such metadata links provide one such navigational infrastructure. In another embodiment, however, a different navigational infrastructure may be utilized.

In an embodiment, the blockchain matrix, the system, and the subsystems may be embedded in a vehicle such as a car or a pickup truck. The system controller may comprise a head unit or telematics unit. The static blockchain may be stored in a memory of the system controller and/or telematics unit. The static blockchain may have subsystem genesis blocks for every possible subsystem that may be installed in the vehicle. Some equipment packages of the vehicle, however, may not have every subsystem installed. For example, a static blockchain may have a subsystem genesis block for a navigation system, but the equipment package of a specific vehicle does not have the navigation system installed, and hence the subsystem blockchain associated with the navigation system remains dormant for the life of the vehicle. Other subsystems, however, are installed in that vehicle, and when these subsystems first activate they begin founding blocks and extending their subsystem blockchains as described above. It is understood that other electro-mechanical systems are also contemplated to be amenable for applying the teachings of the present disclosure.

The subsystems associated with the blockchain matrix may consume services, for example communication services or licensed software services, that may desirably be tracked, recorded, and billed on a per event basis, on a per unit time basis, or on a data tonnage throughput basis. The microcode provided by the subsystem genesis block in the static blockchain can define this billing paradigm, and the subsystem can found event blocks to track the service usage events that can be analyzed to develop a usage bill. In an embodiment, the subsystem itself may periodically traverse and read the event blocks (e.g., event blocks founded and added to the subsystem blockchain since the last periodic billing), tally up a bill, and send a bill to a subscriber associated with the system, for example to an owner of a vehicle. Alternatively, a payment card may be on record, and the subsystem may take the next step and authorize payment with that payment card to a service provider.

The present disclosure teaches a technical solution to the technical problem of how to deploy subsystems into different systems and have the subsystems play different roles in the different systems, as may be desirable. It also provides a solution to tracking consumption of communication services and paying for communication services in different subsystems. It also provides a solution for tracking usage of licensed software and paying for such usage in different subsystems. The teachings may be said to provide an improved computer system in that computing burdens on centralized servers in a service provider's network may be reduced and pushed onto processors in the systems and subsystems actually consuming the communication services. This makes the processing of the computer systems in the service provider's network in effect more efficient.

Figure 1:
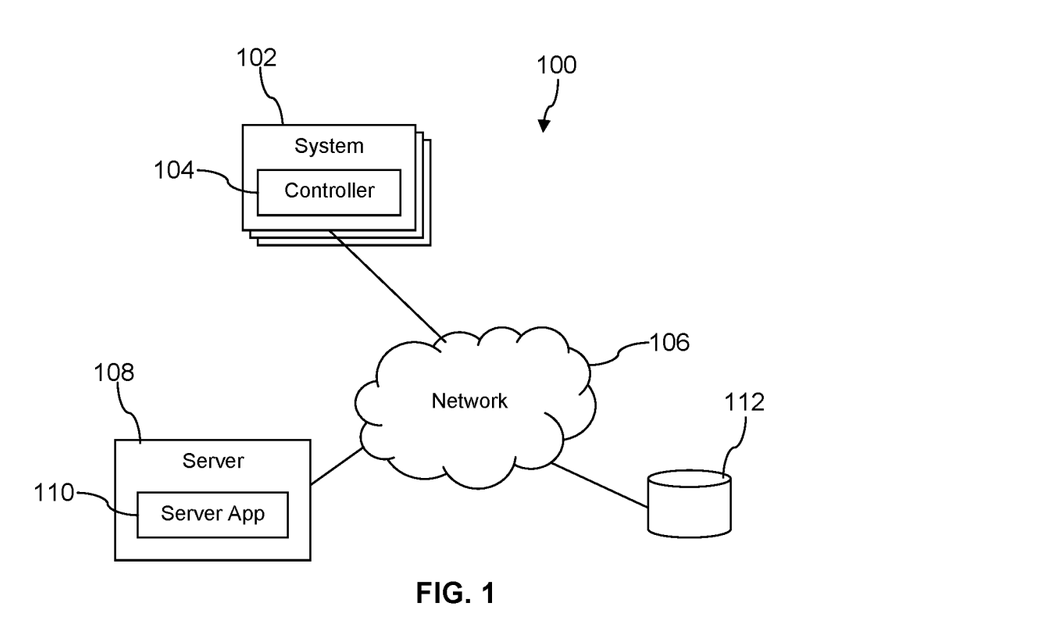
FIG. 1 is a block diagram of a communication system according to an embodiment of the disclosure.

Turning now to FIG. 1, a communication system 100 is described. In an embodiment, the system 100 comprises a plurality of systems 102 each comprising a controller 104, a network 106, a server 108 executing a server application 110, and a data store 112. The controller 104 of the systems 102 may be a computer system. The server 108 may be a computer system. Computer systems are described further hereinafter. The network 106 comprises one or more private networks, one or more public networks, or a combination thereof. The systems 102 may be electro-mechanical systems such as automobiles, pickup trucks, delivery trucks, and other self-powered vehicles. The server application 110 may communicate with the controllers 104 via the network 106 to download event data regarding activities of the controllers and subsystems within the system 102. The systems 102 may communicate with the network 106 via either a wired communication link or via a wireless communication link. In an example, the server application 110 downloads event data recording consumption of communication services by subsystems in the systems 102. The server application 110 may store this event data in the datastore 112 for processing at a later time to establish bills for consumption of the communication services. The event data may comprise records of use of licensed software by the subsystems in the systems 102, and the server application 110 may store these event data items in the datastore 112 for processing to determine software licensing fees incurred by the systems 102. Alternatively, the event data may be analyzed for other purposes.

Figure 2:
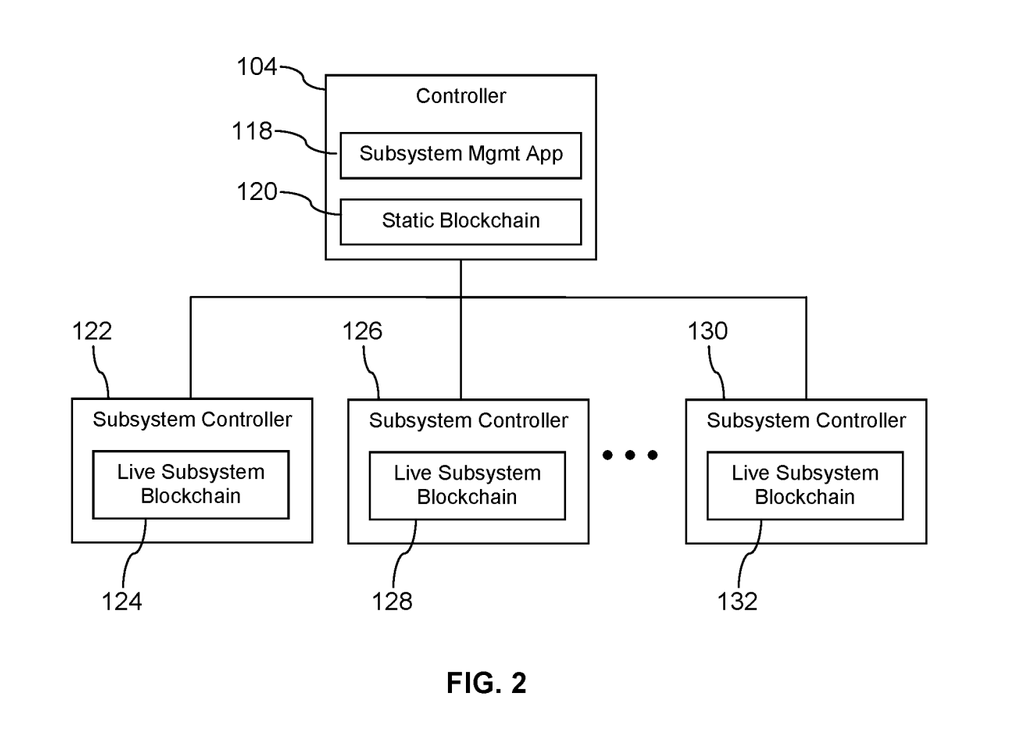
FIG. 2 is a block diagram of a system according to an embodiment of the disclosure.

Turning now to FIG. 2, further details of an exemplary system 102 are described. The controller 104 comprises a static blockchain 120. The system 102 further comprises a first subsystem controller 122 storing a first live subsystem blockchain 124, a second subsystem controller 126 storing a second live subsystem blockchain 128, and a third subsystem controller 130 storing a third live subsystem blockchain 132. The controller 104 may execute a subsystem management application 118 for managing subsystem controllers 122, 126, 130 and live subsystem blockchains 124, 128, 132. In an embodiment, the live subsystem blockchains 124, 128, 132 are not stored in the subsystem controllers 122, 126, 130, but rather the event blocks of the live blockchains 124, 128, 132 are founded or built by the subsystem controllers 122, 126, 130 and are sent by the subsystem controllers 122, 126, 130 to the system controller 104 that stores these event blocks on the live subsystem blockchains that are stored in the system controller 104. The static blockchain 120 and the live subsystem blockchains 124, 128, 132 (and additionally any dormant subsystem blockchains) may be considered to form a blockchain matrix.

While three subsystem controllers are illustrated in FIG. 2, the system 102 may comprise any number of subsystems. The subsystem controllers 122, 126, 130 may be embedded within subsystems of the system 102, for example subsystems of an automobile or a pickup truck. The first subsystem controller 122 may be embedded in an engine control electronic unit of the system 102. The second subsystem controller 126 may be embedded in an entertainment system of the system 102. The third subsystem controller 130 may be embedded in a contextual awareness system (e.g., proximity radar, proximity warning, backup camera, etc.) of the system 102. When a subsystem controller is initially installed into the system 102, for example at time of manufacturing or of assembly (as of assembly of a subsystem manufactured by a vendor or supplier to an automobile OEM), the subsystem controller may not have a live subsystem blockchain. The live subsystem blockchain may be formed from an initially dormant subsystem blockchain when the subsystem controller is first activated within the system 102.

Figure 3:
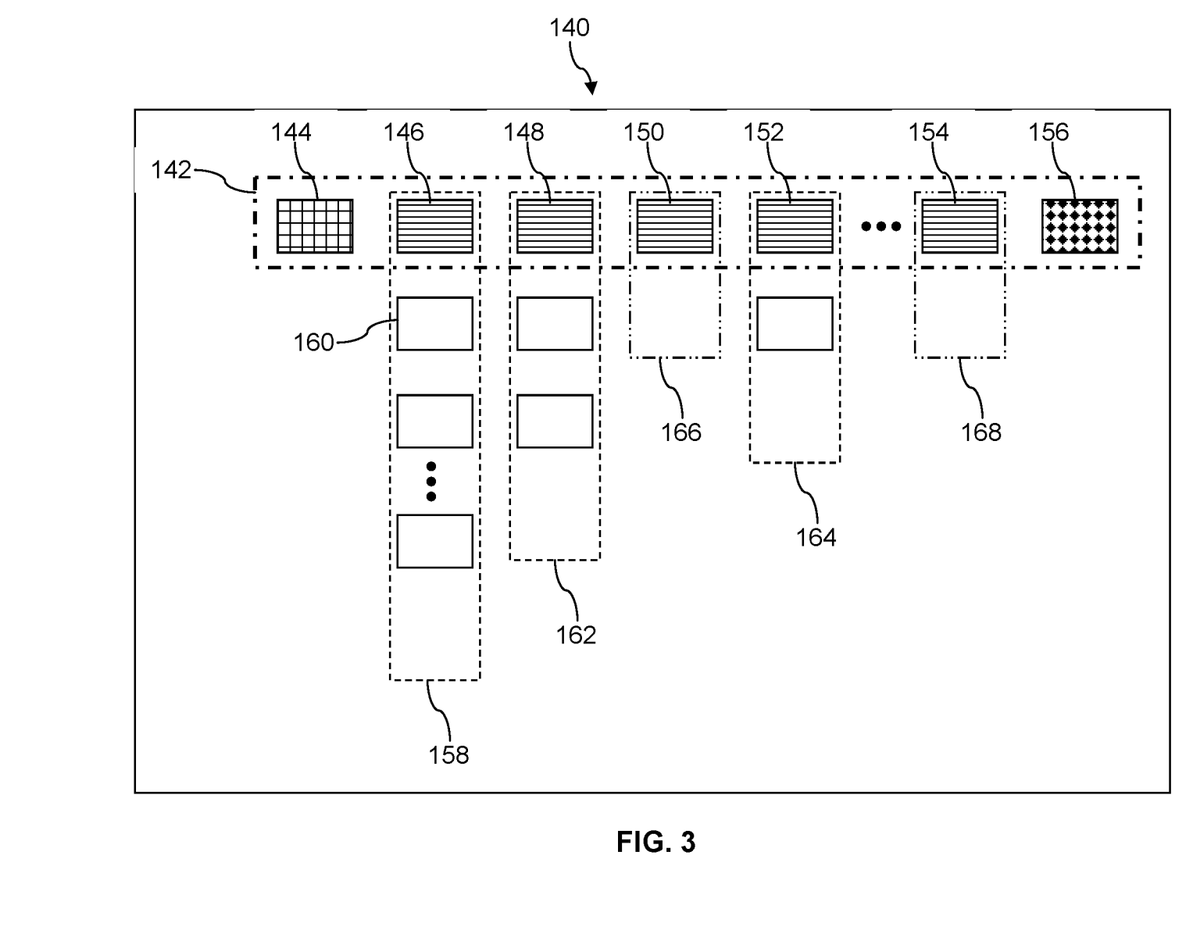
FIG. 3 is an illustration of a blockchain matrix according to an embodiment of the disclosure.

Turning now to FIG. 3, a blockchain matrix 140 is described. The blockchain matrix 140 comprises a static blockchain 142 that comprises a matrix genesis block 144, a first subsystem genesis block 146, a second subsystem genesis block 148, a third subsystem genesis block 150, a fourth subsystem genesis block 152, a fifth subsystem genesis block 154, and a terminal block 156. The static blockchain 142 is referred to as a static blockchain because it is static and does not change after it is initially constructed, for example constructed at an OEM of the system controller 104. The terminal block 156 acts as a stop to the static blockchain 142, preventing any addition of another block onto the static blockchain 142. Each of the blocks on the static blockchain 142 comprises a data portion, a nonce that satisfies a numerical condition, a hash of the previous block (excluding the matrix genesis block 144 that has no previous block), and its own hash over its contents. The nonce may be chosen such that the hash over the block satisfies a particular numerical condition or a particular format condition, for example that the hash has two leading zeros or has four leading zeros.

The data portion of the matrix genesis block 144 may comprise a variety of metadata, such as when the system controller 104 was manufactured, where the system controller 104 was manufactured, a serial number of system 102 into which the system controller 104 is installed, and other metadata. The data portion of the matrix genesis block 144 may comprise microcode that is executed by the system controller 104, for example microcode that is executed to initially configure the system controller 104 on activation of the system controller 104. The system controller 104 may be activated when a new car is sold and delivered to a first owner.

The subsystem genesis blocks 146-154 may comprise microcode for the subsystems controllers 122, 126, 130 to execute. The subsystem genesis blocks 146-154 comprise microcode that executes when the subsystem controllers 122, 126, 130 are initialized in the system 102, for example when they are first powered on after the system controller 104 itself has been activated. This microcode may cause the subsystem controller 122, 126, 130 to self-configure with data values and configuration settings contained in the microcode and/or the data portion of the subsystem genesis block 146-154. When the subsystem controller 122, 126, 130 has initiated, it may create an initiation event block and add this to its own blockchain.

The blockchain matrix 140 may further comprise a first subsystem blockchain 158 that comprises a plurality of event blocks 160 linked to the first subsystem genesis block 146. The first event block on the first subsystem blockchain 158 may capture data about the initialization of the first subsystem controller 122 such as an initialization timestamp. Subsequent event blocks 140 on the first subsystem blockchain 158 may be built by the first subsystem controller 122 when events are experienced or triggered by the first subsystem controller 122. These events may be the initialization of a communication session, the termination of a communication session, and/or the completion of a processing task performed by the first subsystem controller 122. When a subsystem controller 122, 126, 130 adds the first event block to its associated subsystem blockchain, the subsystem blockchain may be said to transition from a dormant condition to a live condition—or from being a dormant subsystem blockchain to a live subsystem blockchain.

The blockchain matrix 140 may comprise a second subsystem blockchain 162 that comprises a plurality of event blocks linked to the second subsystem genesis block 148. The blockchain matrix 140 may comprise a third subsystem blockchain 164 that comprises a single event block linked to the fourth subsystem genesis block 152. The event blocks on the subsystem blockchains 162, 164 are similar to those on the first subsystem blockchain 158: the first event block records information related to the initiation of the subsystem blockchain 162, 164 and, in the case of the second subsystem blockchain 162, subsequent event blocks record information about post initiation processing by the second subsystem controller 126. The third subsystem blockchain 164 comprises only one event block, which is consistent with being initiated but not yet having experienced and recorded any post-initiation events. The subsystem blockchains 158, 162, 164 may be referred to as live subsystem blockchains and are illustrated in FIG. 2 as live subsystem blockchains 124, 128, 132.

The blockchain matrix 140 comprises a first dormant subsystem blockchain 166 and a second dormant subsystem blockchain 168. A dormant subsystem blockchain 166, 168 comprises only its subsystem genesis block 150, 154. A dormant subsystem blockchain may provide flexibility to the system 102, allowing it to readily adapt to the inclusion or exclusion of some subsystems in the system 102, for example the exclusion or inclusion of optional equipment in a new car or pickup truck. The dormant subsystem blockchain allows the static blockchain 142 to be static, which can enhance security and ease of communication between the server application 110 and the system controller 104 and/or the blockchain matrix 140.

Portions of the microcode may further be executed periodically or on events of the subsystem controller 122, 126, 130. For example, when specific events are experienced or triggered by the subsystem controller 122, 126, 130, the subsystem controller 122, 126, 130 may create an event block 160 and add the event block 160 to the subsystem blockchain 158, 162, 164. In an embodiment, the event blocks 160 are stored in the subsystem controller 122, 126, 130 associated with the subject subsystem blockchain 158, 162, 164. In another embodiment, the event blocks 160 are transmitted by the subsystem controllers 122, 126, 130 to the system controller 104, the system controller 104 adds them to the subsystem blockchains 158, 162, 164 and stores the subsystem blockchains 158, 162, 164 in a non-volatile portion of memory in the system controller 104. When the event blocks 160 are stored in the system controller 104, the subsystem controllers 122, 126, 130 may send only the data portion of the event blocks 160, and the system controller 104 builds the event block by creating the nonce, including the hash of the previous block on the subsystem blockchain, calculating the block hash, and founding the event block containing these items.

In an embodiment, the microcode executed on events by the subsystem controllers 122, 126, 130 may record billable events. These events may be the initiation and/or termination of a communication session using a communication service. These events may record the use of licensed software. The events may record a timestamp, an identify of a service, and a duration of service usage. The server application 110 may periodically read event logs from the blockchain matrices 140 of the systems 102 and generate bills. Alternatively, in an embodiment, the server application 110 triggers the controllers 104 of the systems 102 to analyze events 160 on the subsystem blockchains 158, 162, 164, to tote up one or more usage totals (e.g., bills), and send these results back to the server application 110. This may be described in some contexts as generating a report on the operations of one or more subsystems and sending the operations report to the server application 110. In an embodiment, the controller 104 may determine a total amount due for consumption of services by the system 102 during a billing cycle or billing interval and generate a payment transaction with a service provider based on a payment mechanism on record with the service provider.

In an embodiment, when the subsystem controller 122, 126, 130 first activates it reads microcode in its associated subsystem genesis block 146, 148, 152 and configures itself for operation based on executing that microcode. This may comprise configuring the subsystem controller 122, 126, 130 for using communication services and/or licensed software. This may comprise configuring the subsystem controller 122, 126, 130 for premium communication services or communication services according to a predefined service level agreement (SLA). In an embodiment, a subsystem that is installed in a first system 102 having a first static blockchain comprising a subsystem genesis block associated with the subsystem may configure itself based on a first set of microcode stored in the subsystem genesis block of the first static blockchain, while the same subsystem when it is installed in a second system 102 having a second static blockchain comprising a subsystem genesis block associated with the subsystem may configure itself based on a second set of microcode stored in the subsystem genesis block of the second static blockchain. The same subsystem, therefore, installed in different systems 102 may operate differently because different microcode was executed to initialize the subsystem. The different microcode may configure the subsystem to use a first set of communication services in a first system 102 and to use a second set of communication services in a second system 102. The different microcode may configure the subsystem to access communication services according to a first SLA in a first system 102 and to access communication services according to a second SLA in a second system 102.

Figure 4:
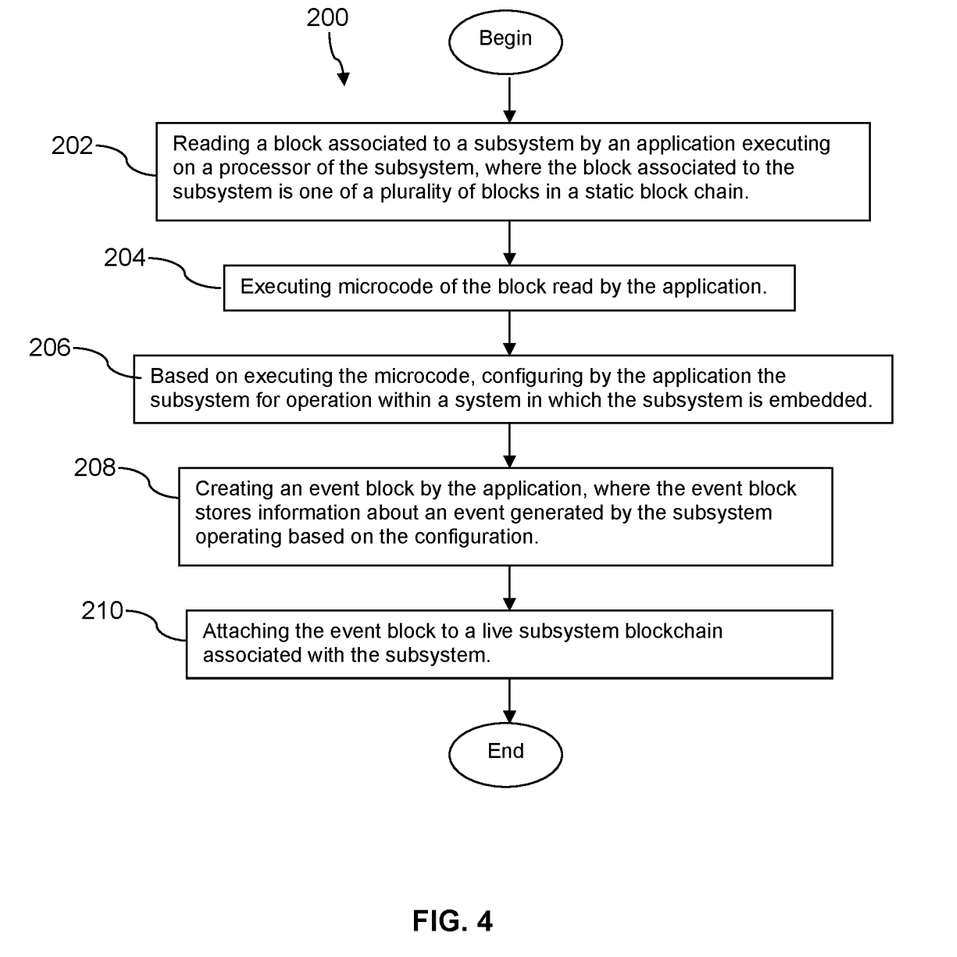
FIG. 4 is a flow chart of a method according to an embodiment of the disclosure.

Turning now to FIG. 4, a method 200 is described. In an embodiment, the method 200 is a method of initializing a subsystem by reading microcode from a block of a static blockchain associated to the subsystem, executing the microcode to configure the subsystem, and building event blocks associated with the subsystem using the block of the static blockchain as a genesis block of a live subsystem blockchain. At block 202, the method 200 comprises reading a block associated to a subsystem by an application executing on a processor of the subsystem, where the block associated to the subsystem is one of a plurality of blocks in a static blockchain.

At block 204, the method 200 comprises executing microcode of the block read by the application. At block 206, the method 200 comprises based on executing the microcode, configuring by the application the subsystem for operation within a system in which the subsystem is embedded.

At block 208, the method 200 comprises creating an event block by the application, where the event block stores information about an event generated by the subsystem operating based on the configuration. At block 210, the method 200 comprises attaching the event block to a live subsystem blockchain associated with the subsystem.

Figure 5:
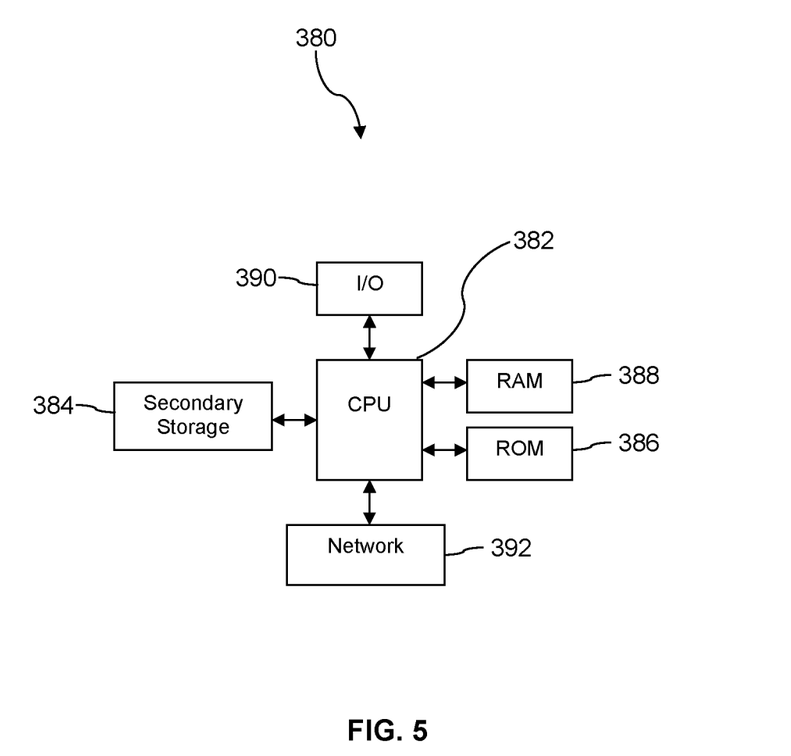
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using fifth generation (5G), 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system controller, comprising:
   a processor;
   a non-transitory memory comprising a blockchain matrix that comprises a static blockchain, where the static blockchain comprises a matrix genesis block and a plurality of subsystem genesis blocks, where the matrix genesis block comprises a first package of microcode that, when executed by the processor, configures the system controller for building live subsystem blockchains that are founded using the subsystem genesis blocks, where each subsystem genesis block serves as a genesis block of a different live subsystem blockchain and comprises a package of microcode that, when executed by a subsystem, configures the subsystem for operation within a system controlled by the system controller; and
   a subsystem management application stored in the non-transitory memory that, when executed by the processor,
   receives event blocks from the subsystems,
   stores the event blocks to a live subsystem blockchain associated with the subsystem that generated the event blocks in the non-transitory memory, and
   processes each of the event blocks of the live subsystem blockchain associated with a subsystem to generate a report on the operations of the subsystem.

2. The system controller of claim 1, wherein some of the event blocks provide information about a communication session of a subsystem.

3. The system controller of claim 1, wherein some of the event blocks provide information about execution of licensed software by a subsystem.

4. The system controller of claim 1, wherein a genesis block of a live subsystem blockchain is associated with metadata that comprises a link to a next block in the static blockchain and a link to an event block on the live subsystem blockchain.

5. The system controller of claim 1, wherein the subsystem management application further generates a bill for use of communication services by the subsystems associated with the system controller and transmits this bill to a communication service provider.

6. The system controller of claim 5, wherein the subsystem management application further pays for the bill via a financial payment mechanism associated to the system controller.

7. A method of initializing a subsystem by reading microcode from a block of a static blockchain associated to the subsystem, executing the microcode to configure the subsystem, and building event blocks associated with the subsystem using the block of the static blockchain as a genesis block of a live subsystem blockchain, comprising:

reading a block associated to a subsystem by an application executing on a processor of the subsystem, where the block associated to the subsystem is one of a plurality of blocks in a static blockchain;

executing microcode of the block read by the application;

based on executing the microcode, configuring by the application the subsystem for operation within a system in which the subsystem is embedded;

creating an event block by the application, where the event block stores information about an event generated by the subsystem operating based on the configuration; and attaching the event block to a live subsystem blockchain associated with the subsystem.

8. The method of claim 7, wherein the block associated to the subsystem in the static blockchain is a subsystem genesis block and wherein the static blockchain and event blocks associated to the static blockchain establish a blockchain matrix.

9. The method of claim 7, wherein the subsystem is one of an engine controller, a navigational system, or an entertainment system.

10. The method of claim 9, wherein the system is one of an automobile or a pickup truck.

11. The method of claim 7, wherein configuring the subsystem for operation comprises configuring the subsystem to access communication services via the system.

12. The method of claim 11, wherein configuring the subsystem to access communication services comprises configuring the subsystem to access communication services according to a service level agreement (SLA) defined in the microcode.

13. The method of claim 7, wherein configuring the subsystem for operation comprises configuring the subsystem to generate a billing report based on reading event blocks on the live subsystem blockchain.

14. The method of claim 13, further comprising generating a billing report associated with licensed software executed on the subsystem based on event blocks on the live subsystem blockchain that capture events related to use of the licensed software.

15. A subsystem, comprising:

a processor;

a non-transitory memory; and an application stored in the non-transitory memory that, when executed by the processor:

reads a block associated to the subsystem, wherein the block is one of a plurality of blocks in a static blockchain, executes microcode read from the block, based on executing the microcode, configures the subsystem for operation within a system in which the subsystem is embedded, creates an event block that stores information about an event generated by the subsystem operating based on the configuration, and attaches the event block to a live subsystem blockchain associated with the subsystem.

16. The subsystem of claim 15, wherein the subsystem is one of an engine controller, a navigational system, or an entertainment system.

17. The subsystem of claim 15, wherein configuring the subsystem for operation comprises configuring the subsystem to access communication services via the system.

18. The subsystem of claim 17, wherein configuring the subsystem to access communication services comprises configuring the subsystem to access communication services according to a service level agreement (SLA) defined in the microcode.

19. The subsystem of claim 18, wherein configuring the subsystem for operation comprises configuring the subsystem to generate a billing report based on reading event blocks on the live subsystem blockchain.

20. The subsystem of claim 15, wherein the live subsystem blockchain is stored by the system.

\* \* \* \* \*